(12) United States Patent
Quarteng-Mensah

(10) Patent No.: US 10,393,626 B2
(45) Date of Patent: Aug. 27, 2019

(54) ENGINE BRAKE TEST TOOL

(71) Applicant: George Quarteng-Mensah, Puyallup, WA (US)

(72) Inventor: George Quarteng-Mensah, Puyallup, WA (US)

(73) Assignee: PACCAR Inc, Bellevue, WA (US)

( * ) Notice: Subject to any disclaimer, the term of this patent is extended or adjusted under 35 U.S.C. 154(b) by 42 days.

(21) Appl. No.: 15/475,036

(22) Filed: Mar. 30, 2017

(65) Prior Publication Data
US 2018/0283989 A1 Oct. 4, 2018

(51) Int. Cl.
| | |
|---|---|
| *G01M 15/02* | (2006.01) |
| *G01M 15/04* | (2006.01) |
| *G07C 5/08* | (2006.01) |
| *F01L 13/06* | (2006.01) |
| *F02D 13/04* | (2006.01) |

(52) U.S. Cl.
CPC .......... *G01M 15/044* (2013.01); *F01L 13/06* (2013.01); *G07C 5/08* (2013.01); *F01L 2103/00* (2013.01); *F01L 2103/01* (2013.01); *F02D 13/04* (2013.01); *G01M 15/02* (2013.01)

(58) Field of Classification Search
CPC .................................................... G01M 15/02
USPC ......................................... 73/114.77, 114.79
See application file for complete search history.

(56) References Cited

U.S. PATENT DOCUMENTS

| | | | | |
|---|---|---|---|---|
| 4,655,178 | A * | 4/1987 | Meneely ................. | F02D 13/04 123/321 |
| 5,000,145 | A * | 3/1991 | Quenneville ......... | F01L 13/065 123/321 |
| 5,186,141 | A * | 2/1993 | Custer ................... | F01L 13/065 123/321 |
| 5,462,025 | A * | 10/1995 | Israel .................... | F01L 13/065 123/321 |
| 5,477,824 | A | 12/1995 | Reedy | |
| 6,325,043 | B1 * | 12/2001 | Meistrick ................ | F01L 13/06 123/321 |
| 6,823,836 | B2 | 11/2004 | Jung | |
| 2010/0024767 | A1 * | 2/2010 | Meneely ............... | F01L 13/065 123/323 |

FOREIGN PATENT DOCUMENTS

CN    101835967 A    9/2010

OTHER PUBLICATIONS

International Search Report dated Jul. 5, 2018, issued in corresponding International Application No. PCT/US2018/025078, filed Mar. 29, 2018, 7 pages.

* cited by examiner

*Primary Examiner* — Eric S. McCall
(74) *Attorney, Agent, or Firm* — Christensen O'Connor Johnson Kindness PLLC; Margie Aoki

(57) ABSTRACT

An engine brake test tool includes a fitting configured to be secured within a valve opening in an engine brake system, wherein the fitting includes a first opening configured to be placed into fluid communication with a pressurized fluid source and a second opening configured to be placed into fluid communication with an oil outlet line leading to a slave piston of an engine brake system.

15 Claims, 4 Drawing Sheets

ENGINE BRAKE TEST TOOL

BACKGROUND

A retarder auxiliary engine brake system provides alternative breaking capacity for heavy duty vehicles when needed. Engine brake systems can apply extended light breaking action with no break fade, thereby controlling the vehicles downgrade speed to save the vehicle service breaks until they are needed.

A portion of an exemplary engine brake system 10 is shown in FIG. 1. The exemplary system is an MX-11 engine brake system; however, it should be appreciated that aspects of the present disclosure generally apply for any suitable engine brake system. The engine brake system 10 includes a solenoid valve 14 secured within a solenoid mounting portion 12 having an oil inlet line 16 and an oil outlet line 20. In that regard, the solenoid valve 14 includes and inlet opening 24 at a bottom end of the valve that is in fluid communication with the oil inlet line 16, and an outlet opening 28 near a middle portion of the valve that is in fluid communication with the oil outlet line 20. The solenoid valve 14, when activated, allows pressurized engine oil to flow from the oil inlet line 16 to the oil outlet line 20 and thereafter to a control valve 18, such as a one-way check valve.

The pressurized engine oil passes through the control valve 18 to extend a slave piston 22 to initiate the engine braking function. Upon pressure from the oil, the slave piston 22 extends and pushes down on an exhaust valve 26. The control valve 18 prevents oil from backing out of the system, i.e., the control valve 18 traps oil in the slave piston 22 to maintain it in an extended state.

During operation, a master piston (not shown) positioned axially beneath the exhaust valve 26 moves between first and second positions in sync with the movement of the slave piston 22 and exhaust valve 26. In other words, as the slave piston 22 and exhaust valve 26 extend, the master piston retracts, and vice versa. Sufficient clearance exists such that when the slave piston 22 and master piston are in sync, the exhaust valve 26 does not interfere with the master piston. If the exhaust valve 26 hits the master piston, severe engine damage could occur. Accordingly, it can be appreciated that if the slave piston 22 is not functioning properly, the exhaust valve 26 could hit or interfere with the master piston.

The slave piston 22 may function sub-optimally if the engine oil is not replaced as needed or other misuse occurs. In such suboptimal conditions, the slave piston 22 may wear, bind, etc., causing the slave piston 22 to either stick during the extension and retraction phases, or not fully extend or retract. Full extension of the slave piston 22 has a direct correlation with engine brake effectiveness. Moreover, stiction in at least one of the extension and retraction phases may cause lower power and may even destroy the engine if the exhaust valve 26 clashes with the master piston.

Thus, there is a need for a system or method for testing the actuation of the slave piston 22 to assess the health of the engine brake system. Testing the movement of the slave piston 22 during engine operation is impractical, since the high pressure oil is flowing through the system. Moreover, a separate test fixture (replicating the brake system) would be costly and cumbersome. The engine brake test tool 10 of the present disclosure allows the functionality of the slave piston 22 to be tested in a simple, inexpensive, safe manner.

SUMMARY

An engine brake test tool includes a fitting configured to be secured within a valve opening in an engine brake system, wherein the fitting includes a first opening configured to be placed into fluid communication with a pressurized fluid source and a second opening configured to be placed into fluid communication with an oil outlet line leading to a slave piston of an engine brake system.

In another aspect, an engine brake test tool for an engine brake system is provided. The engine brake system includes a valve secured within a valve opening, wherein the valve is configured to allow pressurized oil to flow from an oil inlet line to an oil outlet line, and the oil outlet line is configured to be fluidly coupled to a slave piston. The engine brake test tool includes a fitting configured to be secured within the valve opening when the valve is removed. The fitting includes a first opening configured to be placed into fluid communication with a pressurized fluid source and a second opening configured to be placed into fluid communication with the oil outlet line when the fitting is secured within the valve opening, wherein the fitting prevents pressurized oil from flowing between the oil inlet line and the oil outlet line when the fitting is secured within the valve opening.

In yet another aspect, a method of testing a slave piston of an engine brake system having a valve secured within a valve opening, wherein the valve is configured to allow pressurized oil to flow from an oil inlet line to an oil outlet line, and wherein the oil outlet line is configured to be fluidly coupled to a slave piston, includes securing a fitting within the valve opening when the valve is removed. The fitting includes a first opening configured to be placed into fluid communication with a pressurized fluid source and a second opening configured to be placed into fluid communication with the oil outlet line when the fitting is secured within the valve opening, wherein the fitting prevents pressurized oil from flowing between the oil inlet line and the oil outlet line when the fitting is secured within the valve opening. The method further includes flowing pressurized air from the first opening in the fitting to the second opening in the fitting to actuate the slave piston.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
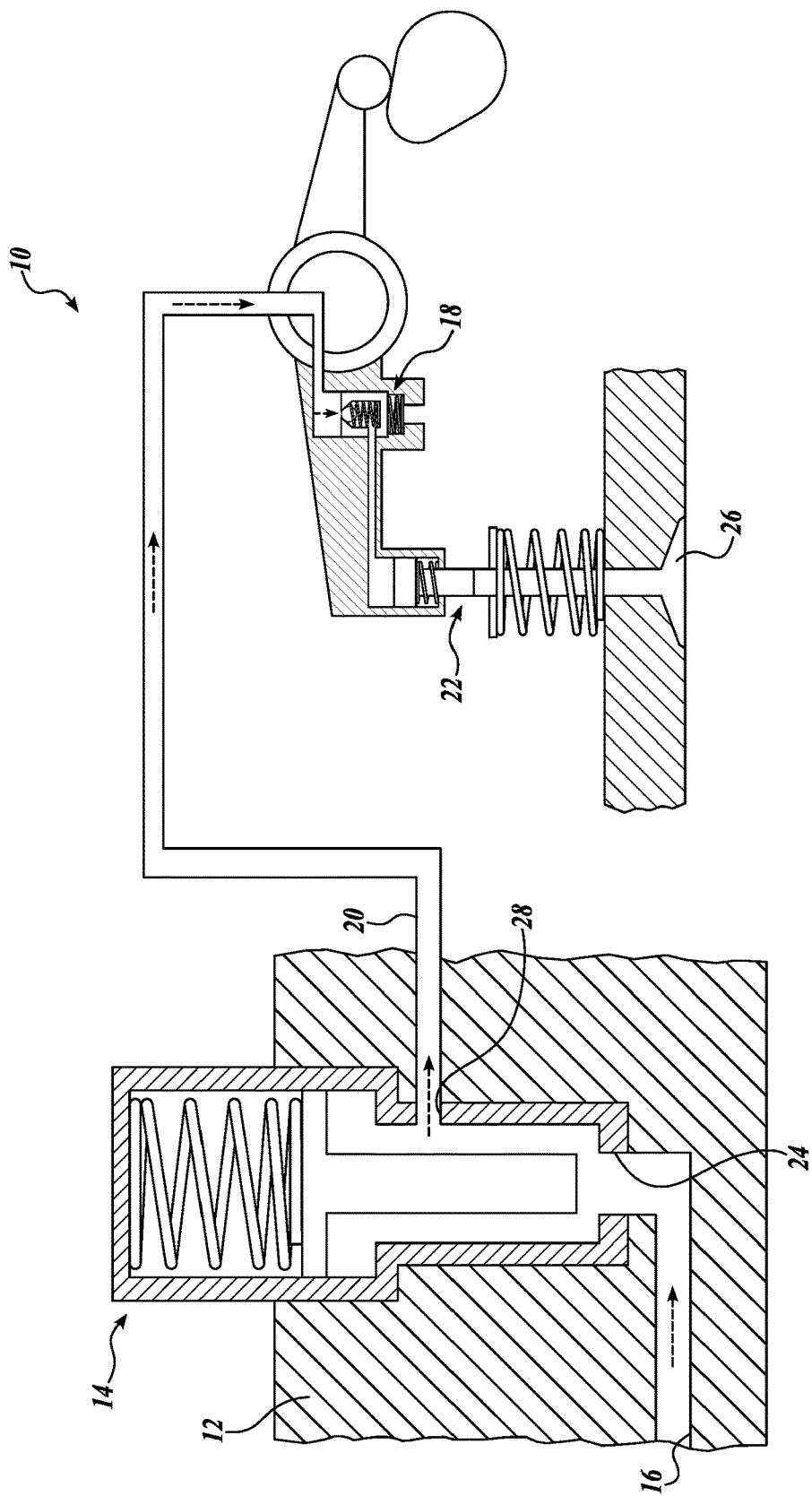
FIG. 1 is an environmental view of a portion of an engine brake system.
Figure 2:
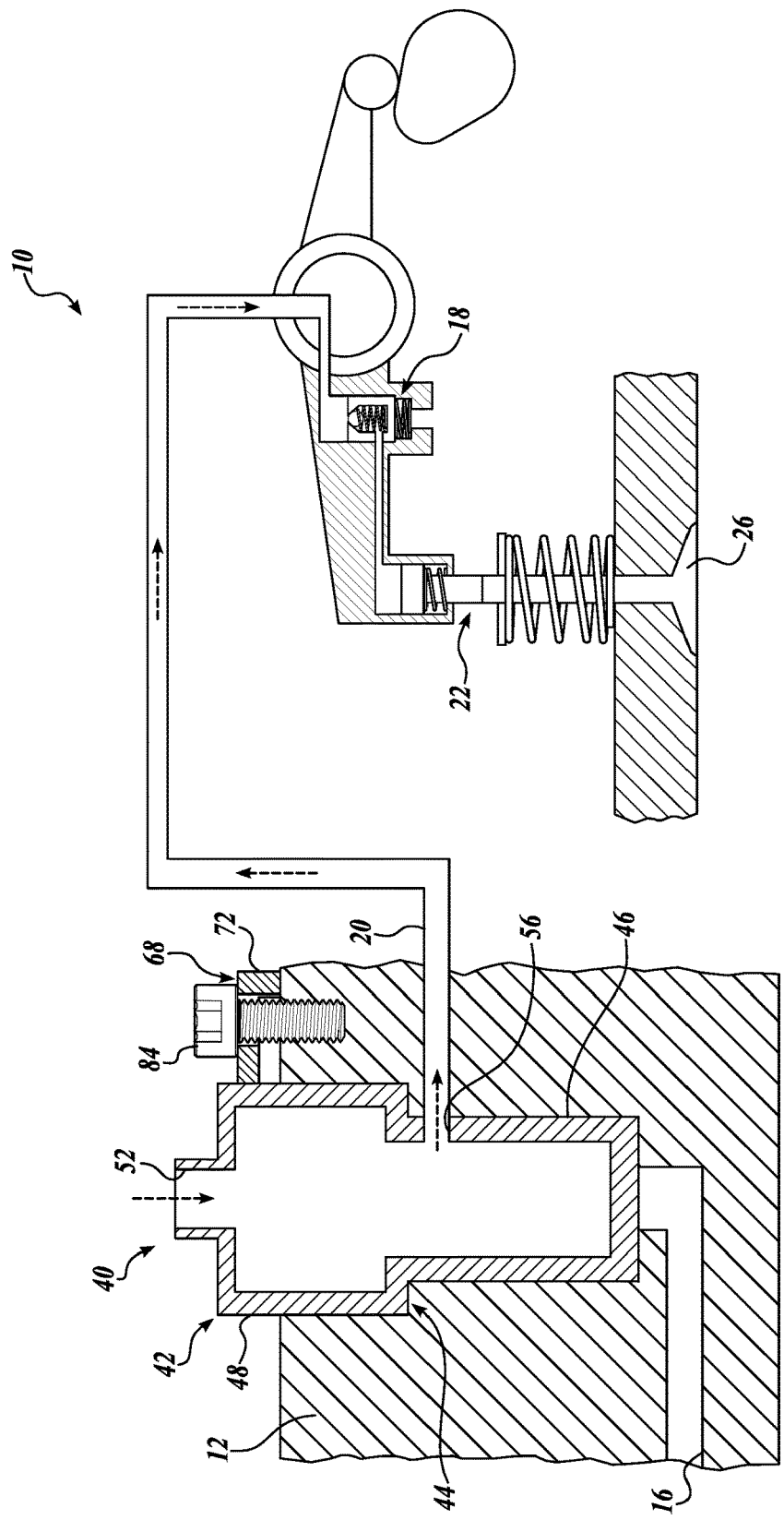
FIG. 2 is an environmental view of an engine brake test tool formed in accordance with an exemplary embodiment of the present disclosure, wherein the engine brake test tool is shown schematically in the engine brake system of FIG. 1.
Figure 3:
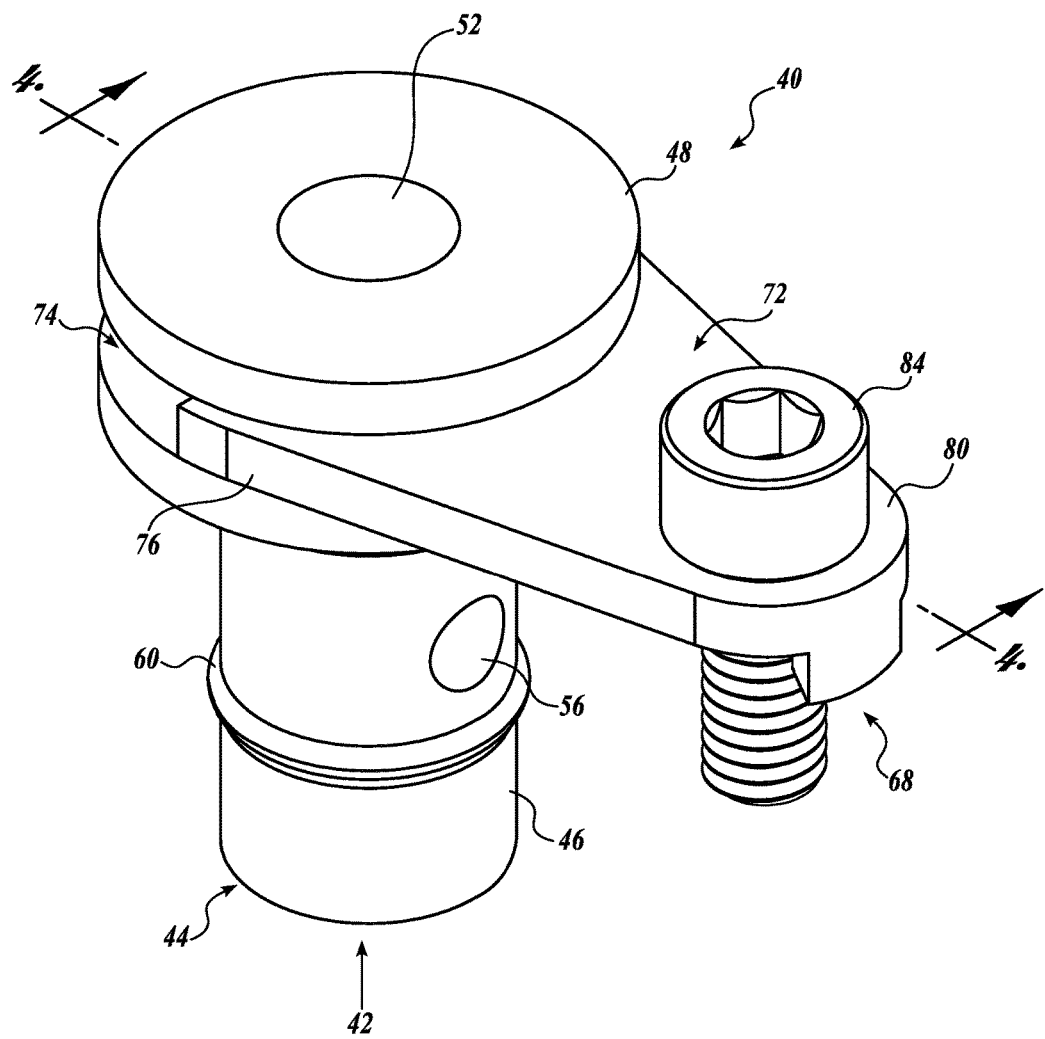
FIG. 3 is a detailed isometric view of the engine brake test tool of FIG. 2.
Figure 4:
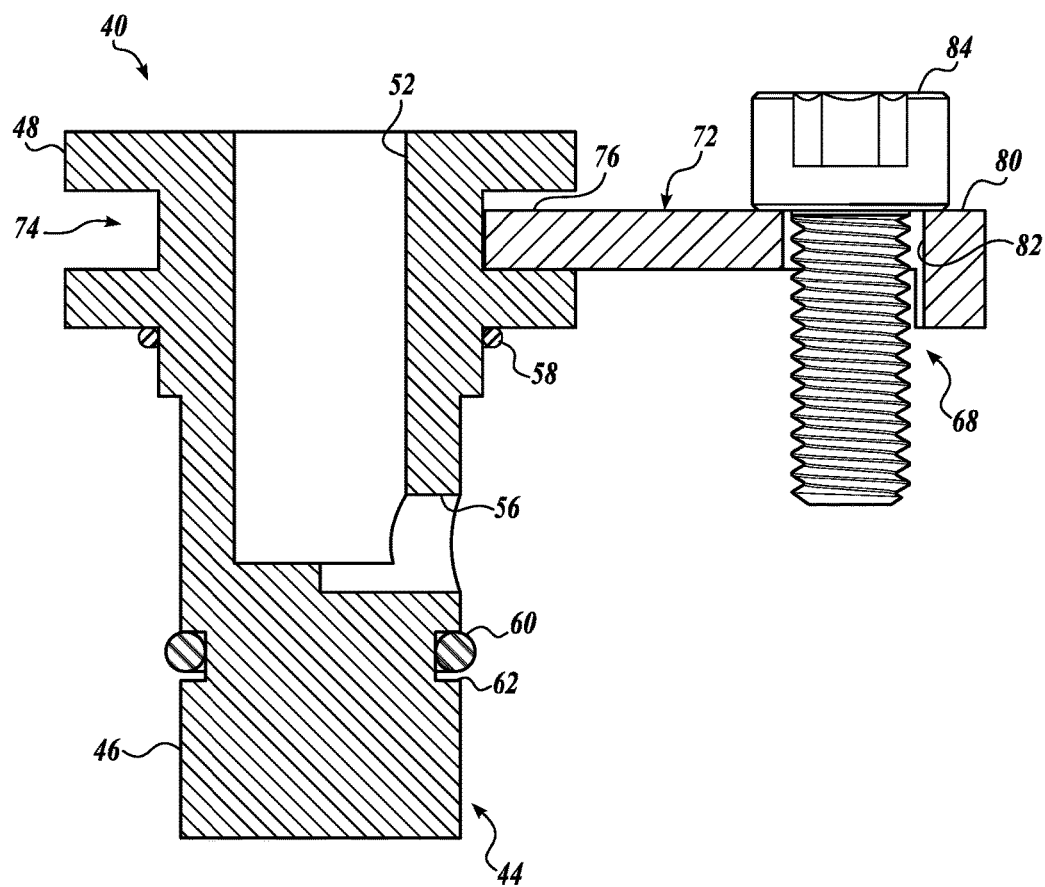
FIG. 4 is a cross-sectional view of the engine brake test tool of FIG. 3, taken substantially across line 3-3.

Referring to FIGS. 2-4, an engine brake test tool 40 formed in accordance with an exemplary embodiment of the present disclosure is depicted. The engine brake test tool 40 is suitable for testing the actuation of a slave piston to assess the health of an engine brake system. In that regard, the engine brake test tool 40 is shown schematically in FIG. 2 with a portion of the MX-11 engine brake system 10 of FIG. 1, wherein the solenoid valve 14 has been removed and replaced with the engine brake test tool 40. It should be appreciated that the engine brake test tool 40 may instead be used with any suitable engine brake system. For instance, in other engine brake systems, valves other than a solenoid valve may be used. Accordingly, the illustrations and descriptions provided herein should not be seen as limiting the scope of the claimed subject matter.

In general, the engine brake test tool 40 is generally configured to allow pressurized fluid to flow from an outside fluid source (separate from the engine brake system 10) to the oil outlet line 20 for actuating the slave piston 22 while preventing pressurized engine oil from flowing from the oil inlet line 16 to the oil outlet line 20. In that regard, an exemplary embodiment of the engine brake test tool 40 for carrying out the function of allowing outside pressurized fluid to flow to the slave piston 22 while preventing pressurized engine oil to flow to the slave piston 22 will now be described in detail.

The engine brake test tool 40 includes a fitting 42 having a body 44 with a hollow interior that is generally shaped, sized, and configured to fit within a solenoid opening (not labeled) defined within the solenoid mounting portion 12 when the solenoid valve 14 is removed. In the exemplary depicted embodiment, the body 44 includes a first cylindrical portion 46 defining a lower portion thereof and a second enlarged cylindrical portion 48 defining an upper portion thereof. The first and second cylindrical portions 46 and 48 generally fit within correspondingly-shaped lower and upper bores of the solenoid opening. Of course, the body 44 may instead have any other shape to match a correspondingly shaped solenoid valve opening or other valve opening.

The fitting 42 further includes a first, inlet opening 52 configured to be placed into communication with an outside pressurized fluid source (not shown), and a second, outlet opening 56 in fluid communication with the oil outlet line 20 of the engine brake system 10 when the fitting 42 is received within the solenoid opening. In the exemplary embodiment, the inlet opening 52 is defined in the second cylindrical portion 48 such that it is accessible when the fitting 42 is disposed within the solenoid opening. Specifically, the inlet opening 52 is centrally defined in an upper end of the second cylindrical portion 48 such that pressurized fluid can enter the interior of the body 44. The outlet opening 56, in the exemplary embodiment, is defined within the first cylindrical portion 46 such that it is in fluid communication with the oil outlet line 20 when the fitting 42 is received within the solenoid opening. In this manner, pressurized fluid may flow into the inlet opening 52, through the interior of the body 44, and out the outlet opening 56 to the oil outlet line 20 of the engine brake system 10.

As shown in the more detailed views of FIGS. 3 and 4, one or more sealing elements, such as first and second O-rings 58 and 60, may be annularly disposed on the exterior of the first cylindrical portion 46 axially above and below the outlet opening 56. In this manner, pressurized fluid flows out of the outlet opening 56 and into oil outlet line 20 of the engine brake system 10 when using the engine brake test tool 40.

The first O-ring 58 may be positioned against a shoulder defined between the intersection of the first and second cylindrical portions 46 and 48. With the first O-ring 58 positioned against the shoulder, the first O-ring 58 is maintained in its axial position on the test tool body 44 as it is moved downwardly into the solenoid opening. The second O-ring 60 may be disposed within an axial groove 62 defined on the exterior of the body 44 to secure it in its axial position below the outlet opening 56. Any other sealing elements or sealing assembly may instead be used.

The fitting 42, when received within the solenoid opening, as shown generally in FIG. 2, may be secured within the solenoid opening in any suitable manner. In the depicted exemplary embodiment, the fitting 42 is secured within the solenoid opening with a clamp assembly 68. The clamp assembly 68 is generally configured to secure the fitting 42 to the solenoid mounting portion 12 (see FIG. 2) when the fitting 42 is disposed within the solenoid opening.

Although any suitable clamp assembly 68 or other structure may be used to secure the fitting 42 within the solenoid opening, in the depicted exemplary embodiment, the claim assembly 68 includes a clamping plate 72 having a first, keyed portion 76 shaped and sized to engage an annular recess 74 defined within the second cylindrical portion 48 of the fitting 42. As can generally be seen in FIG. 2, the second cylindrical portion 48 may have a sufficient axial length such that a portion of the second cylindrical portion 48 having the annular recess 74 protrudes from the upper surface of the solenoid mounting portion 12. In this manner, the keyed portion 76 can mate with the annular recess 74.

The clamping plate 72 further includes a second, attachment portion 80 (opposite the keyed portion 76) configured for securing the clamping plate 72 to the solenoid mounting portion 12 or another suitable portion of the engine brake system 10. For instance, the second attachment portion 80 may include an opening 82 (threaded or non-threaded) for receiving a fastener 84, such as a bolt, for attachment to the solenoid mounting portion 12 or another suitable portion of the engine brake system 10. As can be seen in FIG. 2, the fastener 84 passes through the opening 82 in the second attachment portion 80 and is thereafter secured within a threaded opening (not labeled) in the solenoid mounting portion 12. With the fastener 84 secured to the solenoid mounting portion 12 in this manner, and with the first keyed portion 76 mated with the annular recess 74, the fitting 42 is prevented from moving axially out of the solenoid opening.

A brief exemplary operation of the engine brake test tool 40 will now be described with reference to FIGS. 1 and 2. Referring first to FIG. 1, the engine is first turned off and the solenoid valve 14 is removed from the solenoid mounting portion 12. With the engine off, the fitting 42 is disposed within the opening defined by the missing solenoid valve 14, as shown in FIG. 2. The fitting 42 is secured axially within the solenoid valve opening by engaging the first keyed portion 76 of the clamping plate 72 with the annular recess 74 of the fitting body 44, and the fastener 84 is passed through the opening 82 in the clamping plate 72 and secured within a threaded opening in the solenoid mounting portion 12.

With the fitting 42 secured within the solenoid valve opening, the inlet opening 52 of the fitting 42 is placed into fluid communication with a pressurized fluid source, such as an air compressor or the like. The pressurized fluid flows into the inlet opening 52, out the outlet opening 56 of the fitting 42, and into the oil outlet line 20 of the engine brake system 10. The pressurized fluid flows past the control valve 18 to extend the slave piston 22 to mimic the initiation of the engine braking function.

During the slave piston actuation, observations and measurements can be made as to the movement quality of the slave piston. For instance, observations regarding defect, abrasions, stiction, incomplete extension, etc., can all be made with the engine off. However, the slave piston 22 is tested in the actual environment of the engine brake system 10, which means that the system itself can also be checked for component installation issues, defects, etc. Moreover, the components of the engine brake system 10, such as the slave piston 22, do not have to be removed from the engine brake system 10, thereby reducing cost and complexity.

The detailed description set forth above in connection with the appended drawings is intended as a description of an exemplary embodiment of the engine brake test tool 40 and the method of using the engine brake test tool 40, and is not intended to represent the only embodiment. The representative embodiment described in this disclosure is provided merely as an example or illustration and is not intended to be exhaustive or to limit the claimed subject matter to the precise forms disclosed.

In the foregoing description, numerous specific details are set forth in order to provide a thorough understanding of exemplary embodiments of the present disclosure. It will be apparent to one skilled in the art, however, that exemplary embodiments of the present disclosure may be practiced without some or all of the specific details. In some instances, well-known process steps or features have not been described in detail in order not to unnecessarily obscure various aspects of the present disclosure. Further, it will be appreciated that the exemplary embodiment of the present disclosure may employ any combination of features described herein.

The present disclosure may also include references to directions, such as "forward," "rearward," "front," "back," "upward," "downward," "lateral," "medial," "in," "out," "extended," "advanced," "retracted," "vertical," "horizontal," "proximal," "distal," "central," etc. These references, and other similar references in the present disclosure, are only to assist in helping describe and understand the particular embodiment and are not intended to limit the present disclosure to these directions or locations.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. In an embodiment, "about," "approximately," etc., means plus or minus 5% of the stated value.

While illustrative embodiments have been illustrated and described, it will be appreciated that various changes can be made therein without departing from the spirit and scope of the invention.

The embodiments of the invention in which an exclusive property or privilege is claimed are defined as follows:

1. A fitting for use as an engine brake test tool, the fitting comprising:
    a body configured to be secured within a valve opening in an engine brake system such that the body prevents oil from flowing from an oil inlet line to an oil outlet line of the engine brake system, wherein the oil outlet line is configured to be fluidly coupled to a slave piston;
    a first opening in the body configured to be placed into fluid communication with a pressurized fluid source; and
    a second opening configured to be placed into fluid communication with the oil outlet line when the body prevents oil from flowing from the oil inlet line to the oil outlet line such that pressurized air may flow from the pressurized fluid source to the oil outlet line.

2. The fitting of claim 1, wherein the fitting is configured to be secured within a solenoid valve opening in the engine brake system.

3. The fitting of claim 1, wherein the body that abuts against an opening of the oil inlet line to prevent oil from flowing from the oil inlet line to the oil outlet line when the fitting is secured within the valve opening.

4. The fitting of claim 1, further comprising at least one sealing element disposed on an exterior portion of the fitting.

5. The fitting of claim 1, further comprising a clamp assembly configured to releasably secure the fitting within the valve opening.

6. The fitting of claim 5, wherein the clamp assembly includes a clamping plate engageable with an annular recess of the fitting, and at least one fastener configured to secure the clamping plate to a portion of the engine brake system.

7. An engine brake test tool for an engine brake system having a valve secured within a valve opening, the valve configured to allow pressurized oil to flow from an oil inlet line to an oil outlet line, wherein the oil outlet line is configured to be fluidly coupled to a slave piston, the engine brake test tool comprising:
    a fitting configured to be secured within the valve opening when the valve is removed, the fitting comprising:
        a first opening configured to be placed into fluid communication with a pressurized fluid source; and
        a second opening configured to be placed into fluid communication with the oil outlet line when the fitting is secured within the valve opening,
    wherein the fitting prevents pressurized oil from flowing between the oil inlet line and the oil outlet line when the fitting is secured within the valve opening.

8. The engine brake test tool of claim 7, wherein the fitting is configured to be secured within a solenoid valve opening in the engine brake system.

9. The engine brake test tool of claim 7, further comprising at least one sealing element disposed on an exterior portion of the fitting.

10. The engine brake test tool of claim 7, further comprising a clamp assembly configured to releasably secure the fitting within the valve opening.

11. The engine brake test tool of claim 10, wherein the clamp assembly includes a clamping plate engageable with an annular recess of the fitting, and at least one fastener configured to secure the clamping plate to a portion of the engine brake system.

12. A method of testing a slave piston of an engine brake system having a valve secured within a valve opening, the valve configured to allow pressurized oil to flow from an oil inlet line to an oil outlet line, wherein the oil outlet line is configured to be fluidly coupled to a slave piston, the method comprising:
    securing a fitting within the valve opening when the valve is removed, the fitting having a first opening configured to be placed into fluid communication with a pressurized fluid source and a second opening configured to be placed into fluid communication with the oil outlet line when the fitting is secured within the valve opening, wherein the fitting prevents pressurized oil from flowing between the oil inlet line and the oil outlet line when the fitting is secured within the valve opening; and flowing pressurized air from the first opening in the fitting to the second opening in the fitting to actuate the slave piston.

13. The method of claim 12, further comprising observing the actuation of the slave piston for at least one of defects, abrasions, stiction, and incomplete extension.

14. The method of claim 12, further comprising securing the fitting within the valve opening with a clamp assembly.

15. The method of claim 12, further comprising sealing the fitting within the valve opening.

* * * * *